United States Patent
Liu

(12) 
(10) Patent No.: US 6,244,605 B1
(45) Date of Patent: Jun. 12, 2001

(54) PIVOTAL MECHANISM FOR CONNECTING A HANDLEBAR STEM AND A BOARD OF A SKATE CART

(75) Inventor: Kun-Lian Liu, Taichung Hsien (TW)

(73) Assignee: Kalloy Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 09/534,079

(22) Filed: Mar. 24, 2000

(51) Int. Cl.[7] ....................................................... B62B 7/00
(52) U.S. Cl. ................................ 280/87.041; 280/655.1; 280/87.05; 403/83
(58) Field of Search ............................ 280/87.041, 655, 280/655.1, 87.05, 47.371; 403/150, 154, 157, 161, 84, 83; 16/278, 321, 326, 328, 337

(56) References Cited

U.S. PATENT DOCUMENTS

| | | | |
|---|---|---|---|
| 704,321 | * 7/1902 | Greenwood | 403/154 |
| 1,227,888 | * 5/1917 | Converse | 280/87.041 |
| 4,310,166 | * 1/1982 | Eicher | 280/5.28 |
| 5,277,427 | * 1/1994 | Bryan et al. | 273/186.2 |
| 5,927,733 | * 7/1999 | Banda | 280/87.041 |
| 6,120,044 | * 9/2000 | Tsai | 280/87.05 |
| 6,158,751 | * 12/2000 | Wu et al. | 280/87.041 |

* cited by examiner

Primary Examiner—J. J. Swann
Assistant Examiner—James S. McClellan
(74) Attorney, Agent, or Firm—Rosenberg, Klein & Lee

(57) ABSTRACT

A skate cart includes a board with a front wheel and a rear wheel. A handlebar stem is pivotally connected to a connection port extending from a front end of the board and the front wheel is connected to the handlebar stem. The connection port has two lugs and a lower end of the handlebar stem is engaged between the two lugs. A rod is movably inserted through one of the lugs and a passage in the handlebar stem. When pulling the rod out from the passage in the handlebar stem, the handlebar stem is pivotable relative to the board.

3 Claims, 6 Drawing Sheets

PIVOTAL MECHANISM FOR CONNECTING A HANDLEBAR STEM AND A BOARD OF A SKATE CART

FIELD OF THE INVENTION

The present invention relates to a skate cart which has a board and a handlebar stem pivotably connected to a front end of the board by a pivotal mechanism. The pivotal mechanism has a rod movably inserted through the board and the stem so as to control a folding feature of the skate cart.

BACKGROUND OF THE INVENTION

A conventional skate cart generally includes a board for a user standing thereon, a handlebar stem connected to a front end of the board, a front wheel connected to a lower end of the handlebar stem, and a rear wheel connected to a bottom of a rear end of the board. The user may step one foot on the board and kick the ground by the other foot to gain a forward force to let the skate cart move. In order to have a convenient storage feature for the skate cart, a pivotal mechanism is used to connect the board and the handlebar stem so that the handlebar stem may be collapsed toward the board to let the skate cart have a compact size which is convenient to be carried and stored. Nevertheless, the conventional pivotal mechanism is experienced to include too many parts that consist a complex structure and therefore need frequent maintenance. Furthermore, in the conventional pivotal mechanism, many parts are frictionally moved with each other when operating the pivotal mechanism so that wearing problems limit the term of use.

The present invention intends to provide a pivotal mechanism that employs a rod movably inserted between the handlebar stem and the connection port of the board so that the user simply pulls the rod to collapse the skate cart.

SUMMARY OF THE INVENTION

In accordance with one aspect of the present invention, there is provided a skate cart and comprises a board 30 with a rear wheel on a rear end of the board and a connection port extending from a front end of the board. The connection port has two lugs and one of the lugs has an aperture defined therethrough. A cap extends from an outside of the one of the lugs and encloses the aperture. The cap has a retaining hole defined through an end of the cap. A handlebar stem is pivotably engaged between the two lugs at a lower end of the handlebar stem and a passage is defined through the lower end of the handlebar stem. A rod has a flange extending radially outward therefrom and a threaded recess is defined in one of two ends of the rod. The rod is movably inserted through the cap and disengagably engaged with the passage of the second end of the handlebar stem. A spring is mounted to the rod and biased between the flange and the cap. A bolt is threadedly engaged with the threaded recess of the rod so that when pulling the bolt, the rod is disengaged from the second passage.

The object of the present invention is to provide an easily operating pivotal mechanism for connecting the handlebar stem and the board of a skate board. The user pulls a rod to allow the handlebar stem to be pivoted relative to the board.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
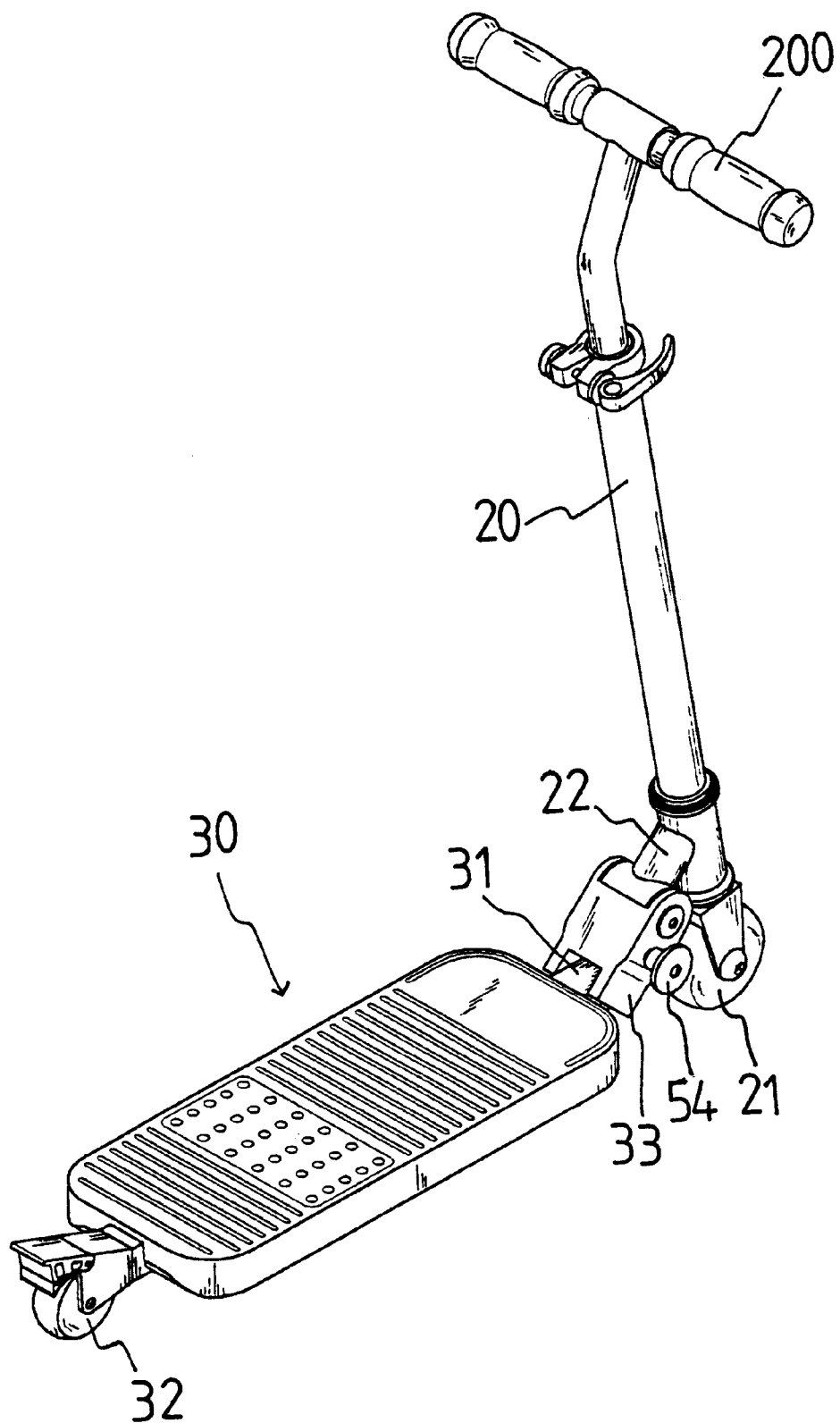
FIG. 1 is a perspective view to show a skate board that has a pivotal mechanism of the present invention.
Figure 2:
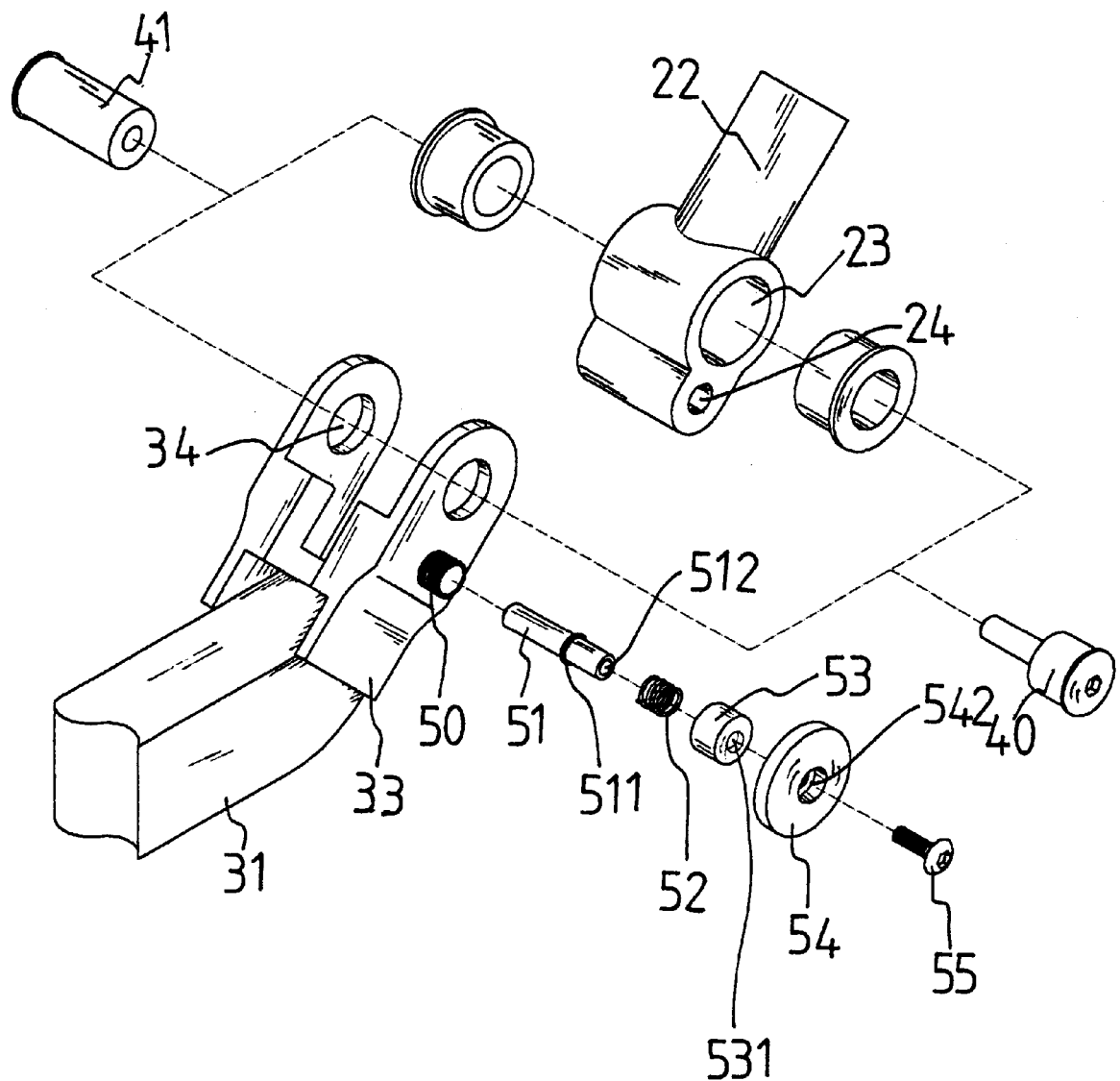
FIG. 2 is an exploded view to show the pivotal mechanism of the present invention.
Figure 3:
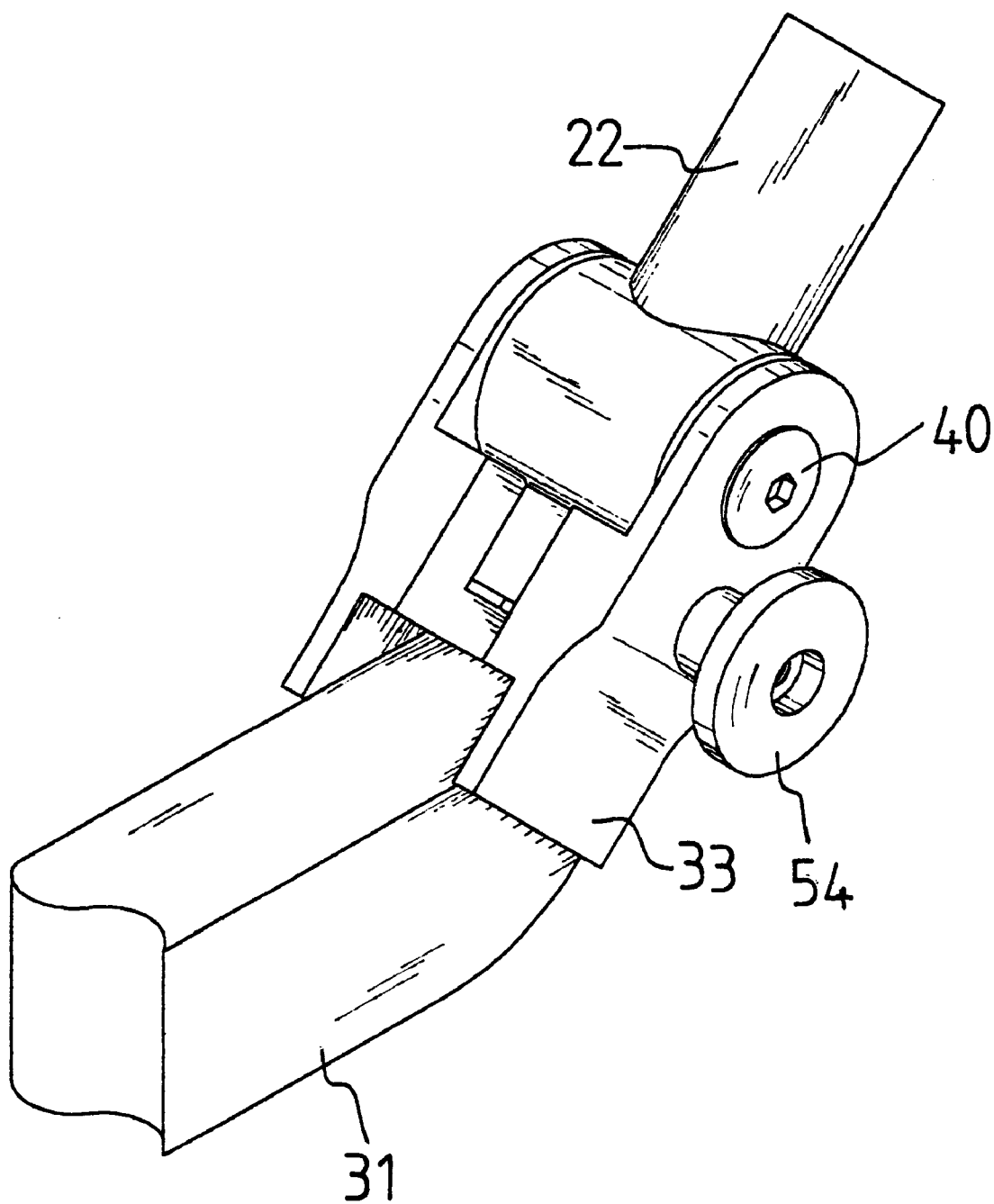
FIG. 3 is a perspective view to show the pivotal mechanism of the present invention.
Figure 4:
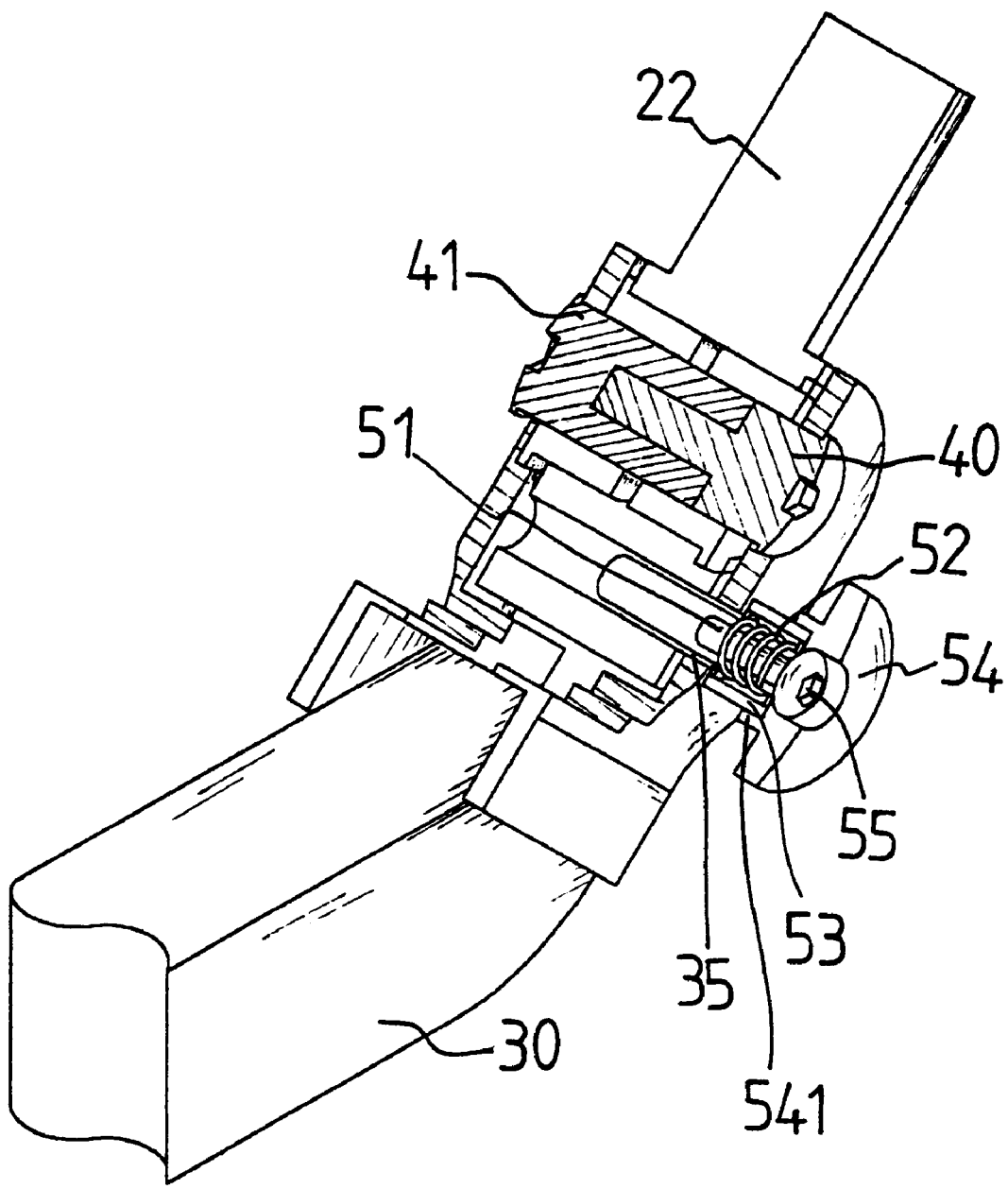
FIG. 4 is a cross sectional view to show the pivotal mechanism of the present invention.

Referring to FIGS. 1 to 4, the skate cart in accordance with the present invention comprises a board 30, a rear wheel 32 connected to a rear end of the board 30, and a connection port 31 extending from a front end of the board 30. The connection port 31 has two lugs 33 extending therefrom and each of the two lugs 33 has a hole 34 defined therethrough. One of the two lugs 33 has an aperture 35 defined therethrough and a threaded tube 50 extends from an outside of the one of the lugs 33 wherein the threaded tube 50 encloses the aperture 35.

A handlebar stem 20 has a handlebar 200 connected to a first end of the handlebar stem 20 and a front wheel 21 is connected to a second end of the handlebar stem 20. A connection member 22 extends radially from a second end of the handlebar stem 20, and a first passage 23 and a second passage 24 are respectively defined through the connection member 22. The connection member 22 IS pivotably engaged between the two lugs 33 of the connection port 31 by a shaft 40 extending through the two holes 34 in the two lugs 33 and the first passage 23, and engaged with a nut member 41. Therefore, the handlebar stem 20 can be pivoted about the shaft 40 relative to the board 30.

Figure 5:
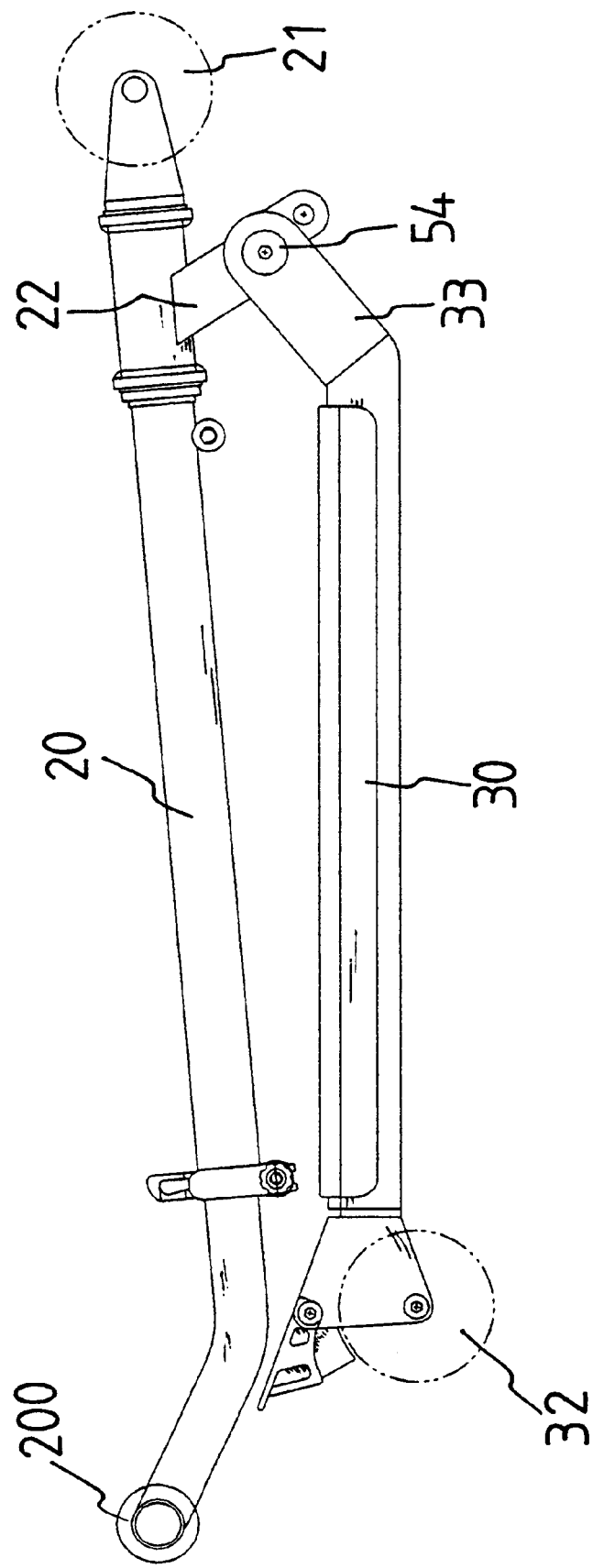
FIG. 5 is an illustrative view to show when the handlebar stem is pivoted toward the board.
Figure 6:
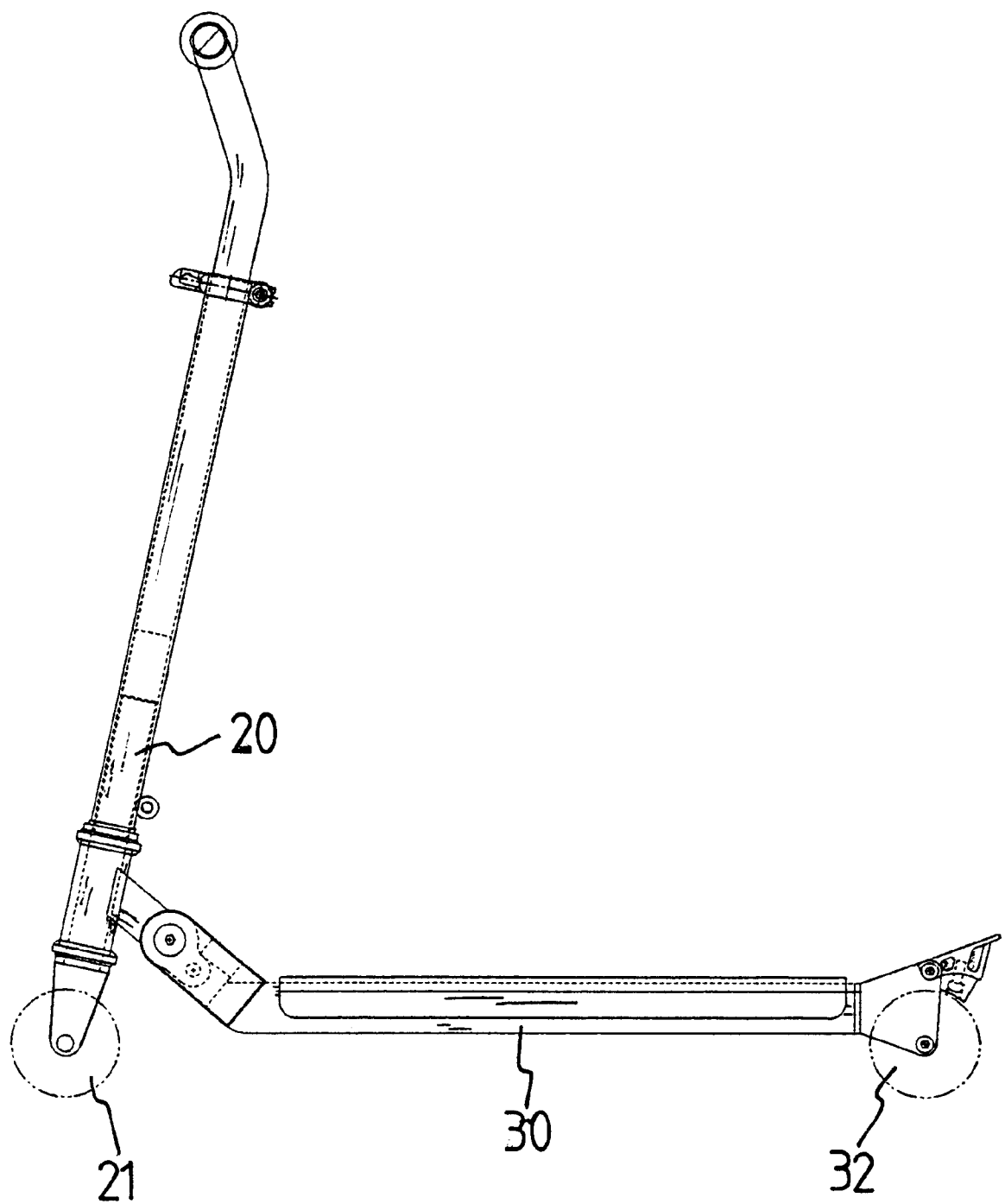
FIG. 6 is an illustrative view to show when the handlebar stem is positioned in its normal position.

A rod 51 is movably inserted in the threaded tube 50 and disengagably engaged with the second passage 24 of the connection ember 22. The rod 51 has a flange 511 extending radially outward from the rod 51 and a threaded recess 512 is defined in one of two ends of the rod 51. A cap 53 is threadedly mounted to the threaded tube 50 and has a retaining hole 531 defined through an end of the cap 53. The end having the threaded recess 512 of the rod 51 movably extends through the retaining hole 531. A spring 52 is mounted to the rod 51 and biased between the flange 511 and the cap 53. A disk 54 has an engaging tube 541 extending from one of two sides of the disk 54 so that the cap 53 is received in the engaging tube 541. A sink recess 542 is defined in the other side of the disk 54 and a bolt 55 extends through the disk 54 and the retaining hole 531 of the cap 53, and is threadedly engaged with the threaded recess 512 of the rod 51. A head of the bolt 55 is engaged with the sink recess 542. Therefore, when a user wants to collapse the handlebar stem 20, he/she holds the disk 54 and pulls the disk 54 away from the connection port 31, the rod 51 is then disengaged from the second passage 24 so that the handlebar stem 20 is able to be pivoted toward the board 30 as shown in FIG. 5. As shown in FIG. 6, when returning the handlebar stem 20 to its use position as shown, holding the disk 54 until the second passage 24 moves to a position in alignment with the aperture 35, the rod 51 is inserted into the second passage 35 by the spring 52.

The operation of the pivotable mechanism of the present invention is easy which includes only one action that is to pull the disk 54. The structure of the mechanism is simple and involves few parts so that the mechanism is easily to be maintained.

While we have shown and described various embodiments in accordance with the present invention, it should be clear to those skilled in the art that further embodiments may be made without departing from the scope and spirit of the present invention.

What is claimed is:

1. A skate cart comprising:

a board;

a rear wheel connected to a rear end of said board, a connection port extending from a front end of said board, said connection port having two lugs extending therefrom, each of said two lugs having a hole defined therethrough, one of said lugs having an aperture defined therethrough and a cap extending from an outside of said one of said lugs, said cap enclosing said aperture and a retaining hole defined through an end of said cap;

a handlebar stem having a handlebar connected to a first end of said handlebar stem, a front wheel connected to a second end of said handlebar stem, a connection member extending radially from a second end of said handlebar stem, a first passage and a second passage respectively defined through said connection member, said connection member pivotably engaged between said two lugs of said connection port and a shaft extending through said two holes in said two lugs and said first passage, and a rod having a flange extending radially outward from said rod and a threaded recess defined in one of two ends of said rod, said rod movably inserted through said cap and disengagably engaged with said second passage of said connection member of said handlebar stem, a spring mounted to said rod and biased between said flange and said cap, a bolt threadedly engaged with said threaded recess of said rod so that when pulling said bolt, said rod is disengaged from said second passage.

2. The skate cart as claimed in claim 1 further comprising a threaded tube extending from an outside of said one of said lugs and said cap threadedly mounted to said threaded tube.

3. The skate cart as claimed in claim 1 further comprising a disk and an engaging tube extending from one of two sides of said disk, said cap received in said engaging tube and a sink recess defined in the other side of said disk, a head of said bolt engaged with said sink recess.

* * * * *